United States Patent [19]

Trozzolo

[11] 3,964,823

[45] June 22, 1976

[54] ARTICLES EMPLOYING PHOTOCHROMIC MATERIALS

[75] Inventor: Anthony Marion Trozzolo, Murray Hill, N.J.

[73] Assignee: Bell Telephone Laboratories, Incorporated, Murray Hill, N.J.

[22] Filed: Mar. 18, 1974

[21] Appl. No.: 451,839

[52] U.S. Cl. .......................... 350/160 P; 252/300; 350/149; 428/438
[51] Int. Cl.$^2$............................................ G02B 5/23
[58] Field of Search ............ 252/300; 350/154, 147, 350/149; 260/239 E, 309.6; 96/90 PC; 428/913, 438

[56] References Cited

UNITED STATES PATENTS

| | | | |
|---|---|---|---|
| 3,329,502 | 7/1967 | Ullman | 350/160 P |
| 3,436,353 | 4/1969 | Dreyer et al. | 252/300 |
| 3,540,793 | 11/1970 | Araujo et al. | 350/160 P |
| 3,609,165 | 9/1971 | Heine et al. | 260/239 E |
| 3,617,114 | 11/1971 | Rogers | 350/154 |
| 3,638,201 | 1/1972 | Borner | 350/160 P |

OTHER PUBLICATIONS

Cromwell, et al., "Ethylene Imine Ketones," J. Amer. Chem. Soc. 73:1044 (1951).

Shurcliff, W. A., *Polarized Light* Harvard University Press, Cambridge, 1962 pp. 47–50.

*Primary Examiner*—Benjamin R. Padgett
*Assistant Examiner*—Deborah L. Kyle
*Attorney, Agent, or Firm*—W. G. Nilsen

[57] ABSTRACT

Articles are described which utilize a unique photochemical property of a certain class of heterocyclic compounds. These heterocyclic compounds are the mono- and bicyclic aziridines. Oriented crystals of these heterocyclic compounds are photochromic in an unusual way. The effect of the excitation radiation and the strength of the resulting absorption band responsible for the appearance of color depend on the polarization of the radiation. These articles contain at least one optically smooth surface. Typical articles are windshields or glass panes which darken on being exposed to glare and sunglasses. Switching devices are also described which exist in two states; one state characterized by absorption of certain radiation over wavelength range and the other state by high transparency.

14 Claims, 4 Drawing Figures

ARTICLES EMPLOYING PHOTOCHROMIC MATERIALS

BACKGROUND OF THE INVENTION

1. Field of the Invention

The invention involves articles which depend for their use on photochromic materials.

2. Description of the Prior Art

Articles employing compounds which are photochromic are well known. They are used in articles which change absorption on being exposed to light. Particular examples of commercial interest are glass windows, automobile windshields and eyeglasses. This class of articles has high optical transparency when exposed to only moderate or low intensities of light and then absorb more and more light as light intensity is increased. Optical limiters are another class of articles which depend on this phenomena. The photochromism of certain aziridines are described in H. W. Heine-R. H. Weese-A. Cooper U.S. Pat. No. 3,609,165, issued Sept. 28, 1971.

In the usual photochromic effect, incident radiation (often called excitation radiation) causes the lower-energy form of the photochromic molecule to transform into a higher-energy form of the molecule which has a different absorption spectrum from the lower-energy form. The change in color is due to the fact that the higher-energy form has a different absorption spectrum from the lower-energy form. Thus, excitation radiation can be used to control the absorption of radiation (usually called signal radiation) as for example, in a light switching device operated by the excitation radiation. It should be noted that the excitation and signal radiation may be outside the visible energy spectrum as, for example, in the U.V. or I.R. region.

A characteristic of articles employing photochromic compounds in commercial use is that they respond equally to all polarization of light. Thus these devices cannot be used where it is desired to discriminate between different polarizations of light or to selectively block out light of one particlar plane of polarization. For example, in some articles it is desirable to absorb reflected (or glare) light which is predominantly one plane of polarization without significantly affecting the transmission of light with the other plane of polarization. This may be desirable, for example, in sunglasses, in windows, in automobile windshields, etc.

Photochromic articles may also be made into light switches operated by a light source. However, since the light switch is equally responsive to all polarizations of light and the signal absorption does not depend on polarization, the excitation radiation cannot be monitored without affecting the light switch and the signal channel monitored without being absorbed.

SUMMARY OF THE INVENTION

The invention is an article of manufacture with at least one optically smooth surface which depends in its operation on a photochromic material being transformed from one form to another in response to excitation radiation. The photochromic material is selected from a particular class of compounds and is in a particular form. The class of compounds have in common heterocyclic three member rings with two carbon atoms and either a nitrogen or oxygen atom. This class of compounds includes the mono- and bicyclic aziridines and certain oxirane compounds with specific substituents as outlined in the detailed description section. The compounds are in crystalline form which are at least partially aligned. These articles not only change color in response to applied radiation, but do so in response to principally one polarization of the excitation radiation. Further, the absorption responsible for the color change is also polarization dependent. One class of articles is used to reduce the undesirable effects of reflected (or glare) light since such light is predominantly in one plane of polarization. Typical articles are windows, automobile windshields and sunglasses or eyeglasses. In these articles, the reflected light causes increased absorption of the reflected light without affecting the light of opposite polarization. Light switching devices utilizing this class of compounds are useful in switching one polarization of signal radiation without affecting the other polarization of the signal radiation by use of one polarization of excitation radiation.

DETAILED DESCRIPTION

Figure 1:
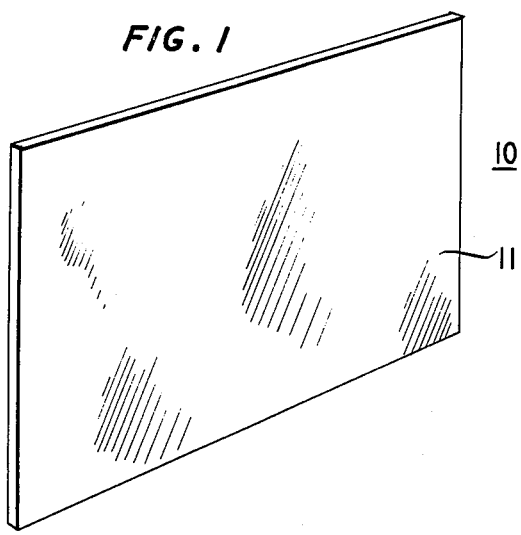
FIG. 1 is an elevation view of a substantially transparent plate prepared in accordance with the invention.

1. Description of the Class of Compounds

The invention involves the use of a certain class of compounds in optical devices. These compounds exhibit a type of photochromism different from that known before. The photochromism of these compounds is dependent on the plane of polarization of the excitation and signal radiation. Thus, light switching devices can be made which affect one plane of polarization of the signal radiation and where only one plane of polarization of excitation radiation is effective in switching the device. The class of compounds all contain 3 member heterocyclic rings with 2 carbons and either a nitrogen or oxygen. The class of compounds includes the mono- and bicyclic aziridines and the bi- and tricyclic oxiranes. By proper selection of compound in this class, the photochromic characteristics of the device can be tailored to particular applications.

The mono- and bicyclic aziridines are discussed first. To facilitate discussion, the structural formula of the mono- and bicyclic aziridines are set forth below.

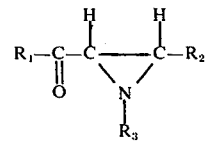

Monocyclic Aziridine

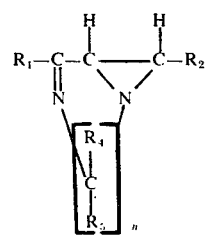

Bicyclic Aziridines

The nature of the substituent groups (labeled $R_1$ through $R_5$ in the formulas above) is outlined. The $R_1$ and $R_2$ groups are aromatic, with or without substituents and with up to three rings. The compounds with unsubstituted aromatic rings exhibit photochromism only at temperatures below room temperature. It is therefore preferred that combinations of substituents be attached to the aromatic groups so as to make the photochromic properties more pronounced at ordinary temperatures. As far as substituents on the aromatic groups of $R_1$ and $R_2$ are concerned, the stability of the photochromic species is increased by either of two combinations of substitutents. The first combination is to have electron-withdrawing groups on $R_1$ and electron-donating groups on $R_2$. The second combination is to have electron-donating groups on $R_1$ and electron-withdrawing groups on $R_2$. Typical electron-donating groups are alkoxy groups and alkyl-substituted amino groups. For convenience of synthesis, the alkyl groups should be limited to up to 10 carbon atoms. Typical electron-withdrawing groups are the nitro group and halogen groups. For both types of substituents, the stabilizing effect on the photochromic species is greatest for ortho and para substitution on the aromatic ring and for this reason, such compounds are preferred. Also, between ortho and para substitution, para is preferred because of ease of synthesis.

Regarding $R_3$, this substituent is an aromatic group, an alkyl aromatic such as a benzyl group or an alkyl aromatic group with a substituent in the aromatic ring. The substituent is preferably electron-donating for maximum stabilizing effect on the photochromic species and preferably in the ortho or para position for the same reason. The para position is preferred for ease of synthesis.

Regarding $R_4$ and $R_5$, these substituents are either hydrogen or alkyl groups with up to 5 carbon atoms. The two substituents need not be the same. The value of $n$ in the formula for bicyclic aziridines (in order words the number of carbon atoms between the nitrogen atoms) range from 1 to 5. Above 5, no substantial change in photochromic property takes place and the compounds become more difficult to make.

The structural formulas of the bi- and tricyclic oxiranes are given below.

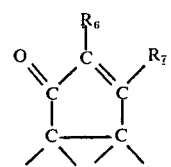

Bicyclic Oxirane

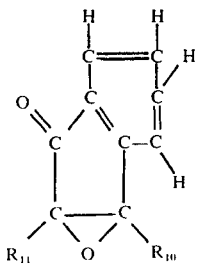

Tricyclic Oxirane

Regarding $R_6$, $R_7$, $R_8$, and $R_9$, these groups may be aromatic, alkyl or hydrogen but with the restriction that at least two of the groups are aromatic. The number of carbon atoms in each group should be up to 20 for ease of synthesis.

Regarding the tricyclic oxirane compounds, $R_{11}$ is either an aromatic or alkyl group with less than 20 carbon atoms. The $R_{10}$ group may be an aromatic group, a carboxylic acid group, an ester group or amide group with up to 20 carbon atoms.

2. The Effect of Changes in Structure on Photochromic Properties

Changes in structural units within the class outlined above changes various aspects of the photochromic properties of the aziridine compounds. Among these photochromic properties are wavelength of the excitation absorption band giving rise to the change in color and the wavelength of the absorption band causing the color change. Also, lifetime of the colored state is altered by various substituents.

When $R_1$ and $R_2$ are aromatic without substituents, the excitation absorption band is at 300 nm and the absorption band of the colored form at 420 nm. Stability of the colored species is increased and absorption bands shifted to lower energy by introducing electron-donor groups to $R_1$ and withdrawing groups to $R_2$ as well as electron-withdrawing groups to $R_1$ and donor groups to $R_2$. Typical values are excitation band about 350–450 nm and colored band about 500–600 nm with lifetime of the colored species at room temperature ranging from approximately 1 minute to several hours.

For example, the monocyclic aziridine with $R_1$ = para-nitrophenyl, $R_2$ = para-methoxyphenyl and $R_3$ = benzyl has its excitation peak at 350 nm and color absorption peak at approximately 490–540 nm. Interchanging the $R_1$ and $R_2$ groups results in the two absorption bands being at 350 and 600 nm, respectively. Both compounds show a lifetime of the colored species in the range of hours. Increasing the value of $n$ in the bicyclic aziridine decreases the lifetime of the colored form. For example, where $R_4 = R_5 = H$ and for $n$ greater than 2, the colored form disappears in less than several seconds. In many applications, rapid disappearance of the colored form is highly desirable.

3. Preparation of the Active Optical Element

In order for the optical element to show polarization dependent photochromism, the crystals of the active compound must be oriented. Single crystals of the aziridine compound are ideal to show the polarization dependent photochromism. However, where large apertures are required, a method of orienting multiple-crystal arrays is more useful. This is done by taking advantage of the shape of small crystals and its relationship to the polarization characteristics of the crystal. The crystals are embedded in an amorphous medium which is then stress distorted to partially align the crystals of photochromic material. To minimize scattering, the crystals are kept small (especially the thickness), preferably less than the wavelength of light. The crystals are implanted in a host material, usually a transparent plastic. Selection of a plastic with index of refraction close to the crystalline aziridine compound also minimizes scattering.

A particularly convenient way of aligning the crystals is to immerse the crystals in a plastic sheet such as nitrocellulose and then to stretch the sheet unidirectionally. Other methods are described in a book entitled *Polarized Light* by W. A. Shurcliff; Harvard University Press, Cambridge, 1966, especially Chapter 4.

Thickness of the sheet and concentration of crystals in the sheet may range over large values depending on the absorption desired. Absorptions of 10 percent [0.9 transmission] to 99.999 percent [0.00001 transmission] find application in various devices. Concentration may vary from 0.0001 molar to 1 molar. The lower limit is imposed so that some effect is obtained, the upper limit to ensure enough plastic to make the sheet structurally satisfactory. Thickness may vary over large limits from 0.1 mm to several centimeters. However, a thickness from 0.5 mm to one centimeter is preferred as a convenient size for optical devices.

For some applications, substantially complete alignment is desirable so as to minimize absorption of light with polarization orthogonal to the polarization being absorbed. For other applications, some absorption in both polarizations is not only tolerable but also desirable. For example, sunglasses, some types of radiation protection devices might require absorption of light of both polarizations although more absorption of one polarization than the other. Typically, a minimum ratio of absorption of 2:1 is desirable to make crystal alignment worthwhile.

The selection of aziridine compound depends on the desired frequency of excitation band, absorption band, lifetime of the colored form, etc. Mixtures of aziridine compounds are also useful where, for example, broader excitation or absorption bands are advantageous.

4. Description of the Figures

FIG. 1 shows a sheet of transparent material 10 with aziridine crystals incorporated in the material. The sheet of transparent material is stretched along one direction 11 so as to orient the crystals. This sheet may be used as is to reduce glare light. It may also be sandwiched between glass to provide greater structural rigidity and prevent scratching of the surface. It may be incorporated in glass for use as a window pane or automobile windshield.

Figure 2:
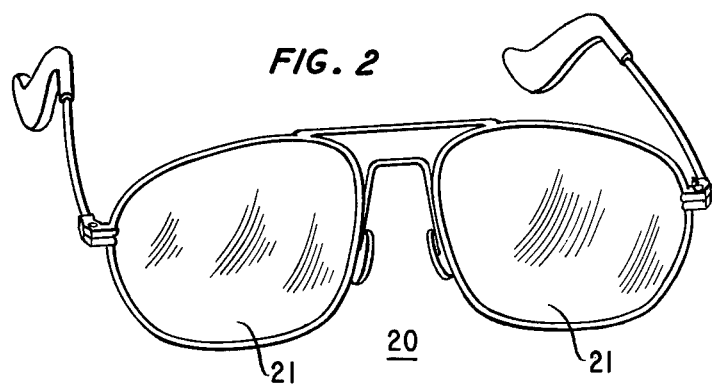
FIG. 2 is an elevation view of sunglasses prepared in accordance with the invention.

FIG. 2 shows a pair of sunglasses 20 with active material in each lens. In moderate light intensity, the lens remains clear but as light intensity increases, especially in the polarization responsible for glare, the lens darkens (becomes absorbing) especially to light polarization responsible for glare. These lenses are also used as a radiation-protection device due to rapid appearance of the absorption after appearance of the excitation radiation.

Figure 3:
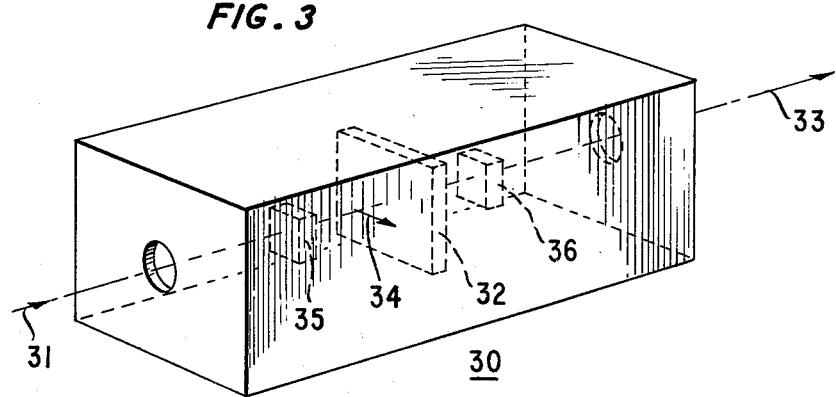
FIG. 3 is an elevation view of a light switching device showing the crystalline photochromic material made in accordance with the invention.

FIG. 3 shows a light switching device 30 with signal light 31 entering the device, the active material in the device 32 and exiting signal light 33. Entering signal light may have different polarization characteristics. The device switches only one polarization of the signal light (that represented by the directional labeled 34) while having little or no effect on the other polarization of the light. Thus, unpolarized light entering the device would emerge with one plane of polarization modulated and the other plane of polarization unmodulated. It should be recognized that the device can be made to modulate and yield modulation light with other polarization characteristics (such as left or right circularly polarized light). This is done by converting the polarization characteristics of the entering signal radiation to plane polarization by use of a suitable device 35 such as a quarter-wave plate. Also, the polarization characteristics of the emerging signal radiation may be changed from plane polarized to another type of polarization (such as circular polarization) by use of a suitable device 36 such as a quarter-wave plate.

Excitation radiation, used to switch the device may enter the device along the same path as the signal radiation 31 (as shown in FIG. 3) or another path. Only one plane of polarization (for example, the one shown by 34) is effective in switching the device. However, a suitable device 35 such as a quarter-wave plate can be used to change one type of polarization to the plane polarization needed to switch the device.

Figure 4:
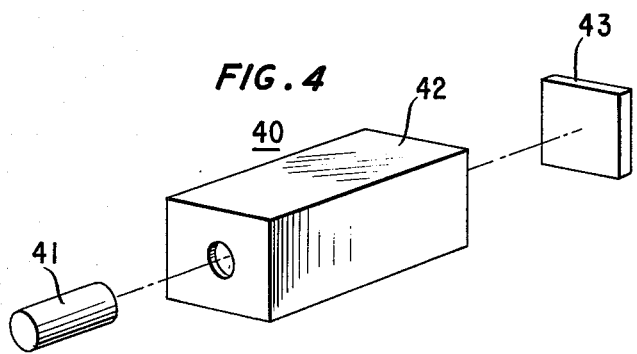
FIG. 4 is an elevation view of a device made in accordance with the invention including light source and detector.

FIG. 4 shows additional components of a switching system 40 including light source 41 such as a laser system or light emitting diode, the modulation or switching system and detection system 43.

What is claimed is:

1. An optically sensitive article which includes at least one element containing photochromic material in which said article changes absorption characteristics at a wavelength range of a first radiation on exposure to a second radiation of a given wavelength range characterized in that the photochromic material is at least partially crystalline and partially crystallographically oriented and contained in an amorphous medium stress distorted to partially align the crystals of photochromic material consists essentially of cyclic aziridine compound with up to three cyclic rings which can be represented by an atomic formula selected from the group consisting of

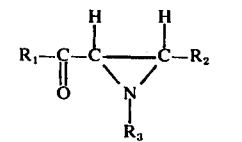

and

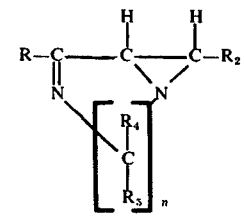

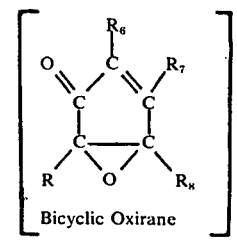

Bicyclic Oxirane

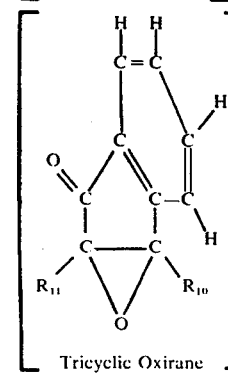

Tricyclic Oxirane in which $R_1$ and $R_2$ are aromatic substituents with up to three rings, $R_3$ is a substituted or unsubstituted benzyl group, $R_4$ and $R_5$ are hydrogen or alkyl groups with up to 5 carbons, $n$ is from 1 to 5, whereby the change in the said absorption characteristic produced by the said second radiation is relatively large for one plane of polarization of the second radiation and the change in the said absorption characteristic is more pronounced for one plane of polarization of the first radiation.

2. The article of claim 1 in which $R_1$ has electron-withdrawing substituents selected from the group consisting of nitro and halogen groups and $R_2$ has electron-donating substituents selected from the group consisting of alkoxy group and alkyl-substituted amino group with the alkyl groups having up to 10 carbon atoms.

3. The article of claim 2 in which the substituents are in the ortho and para positions.

4. The article of claim 1 in which $R_1$ has electron-donating substituents selected from the group consisting of alkoxy and alkyl-substituted amino group with the alkyl groups having up to 10 carbon atoms and $R_2$ has electron-withdrawing substituents selected from the group consisting of nitro and halogen groups.

5. The article of claim 4 in which the substituents are in the ortho and para positions.

6. The article of claim 1 in which the benzyl group has an electron-donating substituent on the aromatic ring selected from the group consisting of alkoxy group and alkyl-substituted amino group with the alkyl groups having up to 10 carbon atoms.

7. The article of claim 6 in which the substituent is in the ortho or para position.

8. The article of claim 1 in which the wavelength range of the first radiation and the wavelength range of the second radiation overlap.

9. The article of claim 1 in which the element is attached to a glass sheet.

10. The article of claim 1 in which the element is sandwiched between glass sheets.

11. The article of claim 1 in which the article has at least two elements connected by a bridge.

12. The article of claim 1 in which the article is in the form of a light switching device.

13. The article of claim 12 which includes a light source and a light detector.

14. The article of claim 1 in which the amorphous medium is organic polymer.

* * * * *

UNITED STATES PATENT AND TRADEMARK OFFICE
CERTIFICATE OF CORRECTION

PATENT NO. : 3,964,823
DATED : June 22, 1976
INVENTOR(S) : Anthony M. Trozzolo

It is certified that error appears in the above-identified patent and that said Letters Patent are hereby corrected as shown below:

Column 3, line 39, "order" should read --other--. Column 4, line 62, "photorchromic" should read --photochromic--. Column 6, line 29, after "material" insert --in which the photochromic material--; lines 48-57, the bracketed formula of claim 1 entitled "Bicyclic Oxirane" should be deleted; lines 58-70, the bracketed formula of claim 1 entitled "Tricyclic Oxirane" should be deleted. Column 7, line 20, after "alkoxy" insert --group--.

Signed and Sealed this

Fifth Day of October 1976

[SEAL]

Attest:

RUTH C. MASON
Attesting Officer

C. MARSHALL DANN
Commissioner of Patents and Trademarks